United States Patent [19]

Sakata et al.

[11] Patent Number: 4,613,626
[45] Date of Patent: Sep. 23, 1986

[54] VINYLIDENE CHLORIDE TYPE RESIN EXPANDABLE PARTICLES, FOAM PARTICLES, IN-MOLD FOAM MOLDING BY USE THEREOF AND PROCESS FOR PRODUCING THEM

[75] Inventors: Norihiko Sakata; Nobuo Miura, both of Suzuka, Japan

[73] Assignee: Asahi Kasei Kogyo Kabushiki Kaisha, Osaka, Japan

[21] Appl. No.: 747,036

[22] Filed: Jun. 20, 1985

Related U.S. Application Data

[62] Division of Ser. No. 678,416, Dec. 5, 1984, Pat. No. 4,550,003.

[30] Foreign Application Priority Data

Dec. 13, 1983 [JP] Japan .................................. 58-233602
Dec. 14, 1983 [JP] Japan .................................. 58-235594

[51] Int. Cl.$^4$ ............................ C08V 9/18; B29H 7/20
[52] U.S. Cl. ........................................ 521/60; 264/53; 264/DIG. 5; 264/DIG. 9; 264/DIG. 15; 521/56; 521/58; 521/145
[58] Field of Search ............ 264/53, DIG. 5, DIG. 9, 264/DIG. 15; 521/58, 60, 145, 56

[56] References Cited

U.S. PATENT DOCUMENTS

| | | | |
|---|---|---|---|
| 3,615,972 | 10/1971 | Morehouse, Jr. et al. | 521/56 |
| 3,983,080 | 9/1976 | Suh et al. | 521/145 |
| 4,075,138 | 2/1978 | Garner | 54/56 |
| 4,477,599 | 10/1984 | Otsu et al. | 521/145 |
| 4,550,003 | 10/1985 | Sakata et al. | 521/145 |

*Primary Examiner*—Morton Foelak
*Attorney, Agent, or Firm*—Birch, Stewart, Kolasch & Birch

[57] ABSTRACT

This invention discloses a vinylidene chloride resin type in-mold foam molding having a broad cross-sectional area and a free shape, useful as thermal insulating plate materials or anti-shock molded vessels, and foam particles or expandable particles convenient for preparation thereof, and also a series of advantageous foaming techniques for completion of such a molding. The above foam molding can be prepared by bringing fine particles of a non-crystalline vinylidene chloride type resin obtained generally by suspension polymerization into contact with a volatile organic blowing agent thereby impregnating the resins with the blowing agent to form expandable resin particles, which are in turn subjected to expansion as such, or after forming into pre-expanded foam particles including expandable gas therein, by filling in a mold cavity which can be closed but not sealed, under heating to form a molding through fusion mutually between the expanded particles.

6 Claims, 11 Drawing Figures

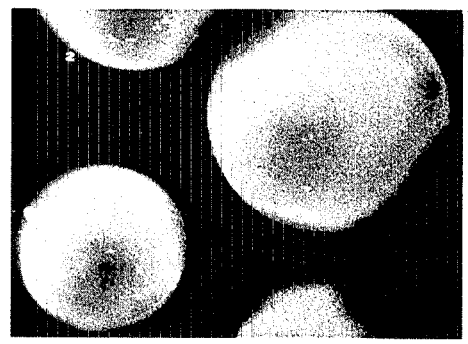
FIG. IA
0.1mm
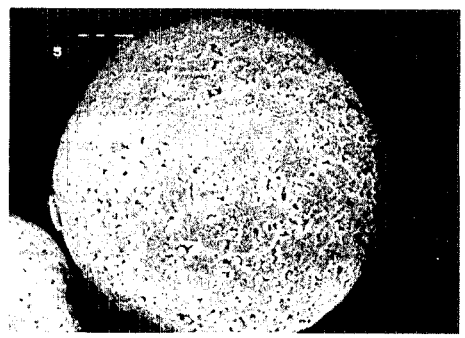
FIG. IB
0.1mm
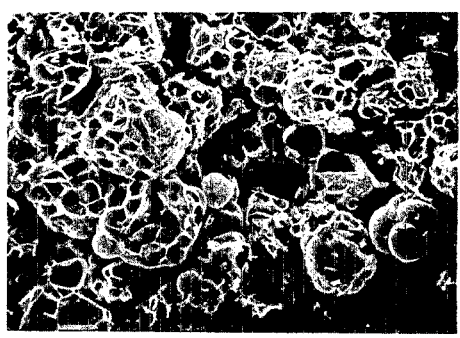
FIG. 6
1mm

VINYLIDENE CHLORIDE CONTENT IN VINYLIDENE CHLORIDE METHYL METHACRYLATE COPOLYMER RESIN (wt %)

VINYLIDENE CHLORIDE TYPE RESIN EXPANDABLE PARTICLES, FOAM PARTICLES, IN-MOLD FOAM MOLDING BY USE THEREOF AND PROCESS FOR PRODUCING THEM

This application is a divisional of copending application Ser. No. 678,416, filed on Dec. 5, 1984, now U.S. Pat. No. 4,550,003.

BACKGROUND OF THE INVENTION

1. Field of the Invention

This invention relates to an in-mold foam molding of a vinylidene chloride type resin, and expandable particles and foam particles convenient for preparation of the molding, more particularly to a novel vinylidene chloride type resin in-mold foam molding having a broad cross-section and a free shape which can be utilized as such for insulating material boards, shock absorbing molded vessels, etc., and a series of foaming techniques sufficient for completion thereof.

2. Description of the Prior Art

In recent years, abundant studies have been made about techniques for expansion of synthetic resins. As a result, a large number of synthetic resins have been made expandable, and individual technical fields have developed depending on the type of resins used. However, a complete technique for obtaining good foam molding which is satisfactory with respect to cross-section, shape and dimension has not been developed for vinylidene chloride type resins. Accordingly, there exists no foam molding having a broad cross-sectional shape and a plate area which can be used as such for an insulating material board.

The following reasons for this behavior may generally be contemplated for vinylidene chloride type resins:

(1) The processing temperature for melt processing of the resin is so close to the decomposition temperature at which decomposition will proceed that thermal decomposition of the resin will occur in the extrusion processing step;

(2) Decomposition of the resin is markedly accelerated when the resin comes into contact with a metal such as iron or copper under a temperature around the melting point of the resin;

(3) Due to high gas barrier property of the resin, the resin can be impregnated only with a small amount of a blowing agent, and therefore it can expand little by heating;

(4) The dependency of the rheological properties of the resin on the temperature around the expansion temperature is so great that the expanding conditions are difficult to control.

Thus, under the present situation, it is very difficult to obtain a highly expanded homogeneous foam molding without causing thermal decomposition, and no satisfactory foaming technique has been developed.

In the prior art, concerning foam moldings of vinylidene chloride type resins and preparation thereof, for example, proposals have been made about extrusion expansion by choice of special chemical blowing agents (Japanese Patent Publications Nos. 3968/1964 and 16419/1967, U.S. Pat. No. 2,948,048). However, these foam moldings are low in expansion ratio, which is about 2- to 3-fold, and the final product cross-sections are limited to small cross-sectional shapes, as represented only by artificial bamboo blind, artificial bamboo blind core, ornamental threads, etc. The purpose of expansion is also no more than controlling the surface lustre or imparting flexibility.

Alternatively, as a technique for high expansion by use of a physical blowing agent, the method has been also known, in which finely divided vinylidene chloride type resin is mixed with a physical blowing agent, and the resultant mixture is extrusion expanded at lower temperatures (about 120° to 150° C.) to give an extruded foam with a density of about 240 Kg./m$^3$ or less and cell sizes of about 0.1 to 1 mm (U.S. Pat. No. 3,983,080). However, according to this method, it is difficult to control thermal decomposition and thermal decomposition of the resin proceeds, whereby it is possible to continue extrusion expansion to give only strand-shaped foamed extrudate with uneven surface and markedly irregular cell sizes.

Further, expandable unicellular spherical particles with diameters of about 1 to 50 um including a volatile liquid blowing agent within a thermoplastic resin copolymer have also been proposed (Japanese Patent Publication No. 26524/1967 and Japanese Laid-open Patent Publication No. 59168/1974). In this proposal, the definition of the thermoplastic resin is inclusive of copolymers of vinylidene chloride with acrylonitrile or butyl acrylate, and there is the description in a part of the examples that a foam-like product can be formed through fusion of the particles by effecting heating expansion. However, the above foam and the foam of the present invention differ in principle of expansion, the structures of particles and foam, performance and therefore use. The technical difference is explained to draw clearly a line of demarcation between both.

First, as the greatest difference in technique, the foam of the present invention is prepared by expanding particles containing a blowing agent impregnated (dissolved) therein to give multi-cellular foam particles enriched in recovery and resilience. The multi-cellular particles are in turn formed into a mass according to the in-mold molding technique. As a consequence, it is possible to obtain a foam with a high closed cell percentage excellent in mechanical strength. In contrast, the expandable particles according to the aforesaid proposal are so called micro-baloons, in which liquid blowing agent is included within small baloon-like entities made of a resin, and therefore, even when these may be fused by heating expansion, the resultant foam molding is a mass consisting of units of baloon-like unicellular bubbles, with a low close cell percentage, and also inferior in mechanical characteristics. Further, the microbaloons are used primarily as a mixture with inks or paints for applying relief patterns on wall papers, etc., and their particle sizes are very small, as small 1 to 50 um, as mentioned above. Therefore, when it is attempted to mold the particles, they cannot be filled uniformly within a mold or steam cannot be passed to inner portions of the molding. Thus, they are basically different from the expandable resin particles of the present invention in that they cannot be formed into a mass according to the in-mold expansion molding as intended by the present invention. Also, the expandable resin particles of the present invention can be extrusion expanded to give a homogeneous good extrusion expanded board with a large cross-section and high closed cell percentage. On the other hand, when the expandable resin particles according to the above proposal are attempted to be extrusion expanded, the shells of the resin containing the liquid blowing agent will be broken to form an unhomogeneous mixture of the resin and the blowing agent, which can be discharged through the nozzle only to result in evaporation of the blowing agent, with the resin substantially failing to be expanded. Also, in this respect, the expandable resin particles of this invention are fundamentally different from the expandable particles according to the above proposal.

SUMMARY OF THE INVENTION

The present invention has been accomplished under such a situation, and its first object is to provide a foam of a vinylidene chloride type resin fully enjoying the characteristics possessed by the vinylidene chloride type resin (e.g. flame retardancy, oil resistance, chemical resistance, gas barrier characteristic, mechanical strength, etc.) with a cross-section and a dimension, which can be used as such in, for example, a board for insulating material.

A second object is to provide expandable vinylidene chloride type resin particles and foam particles prepared by pre-expansion thereof, which are advantageous in accomplishing the first object.

Further, a third object is to provide advantageous processes for producing the expandable particles, foam particles and foam moldings prepared therefrom, respectively, to be used for accomplishing the above first and second objects.

In the first place, the summary of the present invention as a whole, namely a series of foaming techniques may be set forth in terms of the relation between the main claim and the above objects as follows.

The first object of the present invention can be accomplished readily by practicing an embodiment of the present invention, namely a vinylidene chloride type resin in-mold foam molding, comprising a large number of multi-cellular foam particles made of a substantially non-crystalline vinylidene chloride type resin with an average particle size of 0.08 to 25 mm which are closely fused together mutually with adjacent particles thereby forming a foam with an expansion ratio of 4 to 150. The vinylidene chloride type resin foam satisfying the above first object is a novel foam, the emergence of which has heretofore been expected of its emergence, but which existed nowhere in the world. The present inventors have accomplished this for the first time by utilizing the expandable particles or the pre-expanded foam particles satisfying the second object of the invention, namely by preparing expandable vinylidene chloride type resin particles, comprising a volatile organic blowing agent incorporated in substantially non-crystalline vinylidene chloride type resin particles with an average particle size of 0.05 to 5 mm, said particles having smooth surfaces without interstice, filling said particles directly in a mold and permitting them to expand to form a molding, or pre-expanding the expandable particles once into foam particles, namely vinylidene chloride type foam particles, which are multi-cellular particles with a closed cell percentage of 65% or more obtained by expansion of the substantially non-crystalline vinylidene chloride type resin particles to 4 to 150-fold and include a volatile organic blowing agent gas within the particles, followed by filling of the foam particles in a mold for expansion into a foam molding.

The specific features of the processes for readily obtaining these expandable particles, foam particles and in-mold foam moldings, namely the processes satisfying the third object of the present invention reside in employing substantially non-crystalline vinylidene chloride type resins with small particle sizes and adopting the so called contact impregnation method, in which the resin is impregnated by contact with a volatile organic blowing agent under the temperature conditions where impregnation can be effected rapidly; utilizing the ability of retaining the volatile blowing agent possessed by the non-crystalline vinylidene chloride type resin and expandability of the impregnated resin on heating to a multi-cellular product with a high closed cell percentage; and adopting the heating expansion in-mold molding method employing a cavity, which can be closed but is not sealed.

BRIEF DESCRIPTION OF THE DRAWINGS

FIG. 1(A) shows an electron microscope photograph of the non-crystalline vinylidene chloride type resin particles according to the present invention;

FIG. 1(B) shows an electron microscope photograph of crystalline vinylidene chloride type resin particles for a comparative purpose;

FIG. 6 is an electron microscope photograph of the fractured surface of the foam molding of the present invention;

DESCRIPTION OF THE PREFERRED EMBODIMENTS

Figure 2:
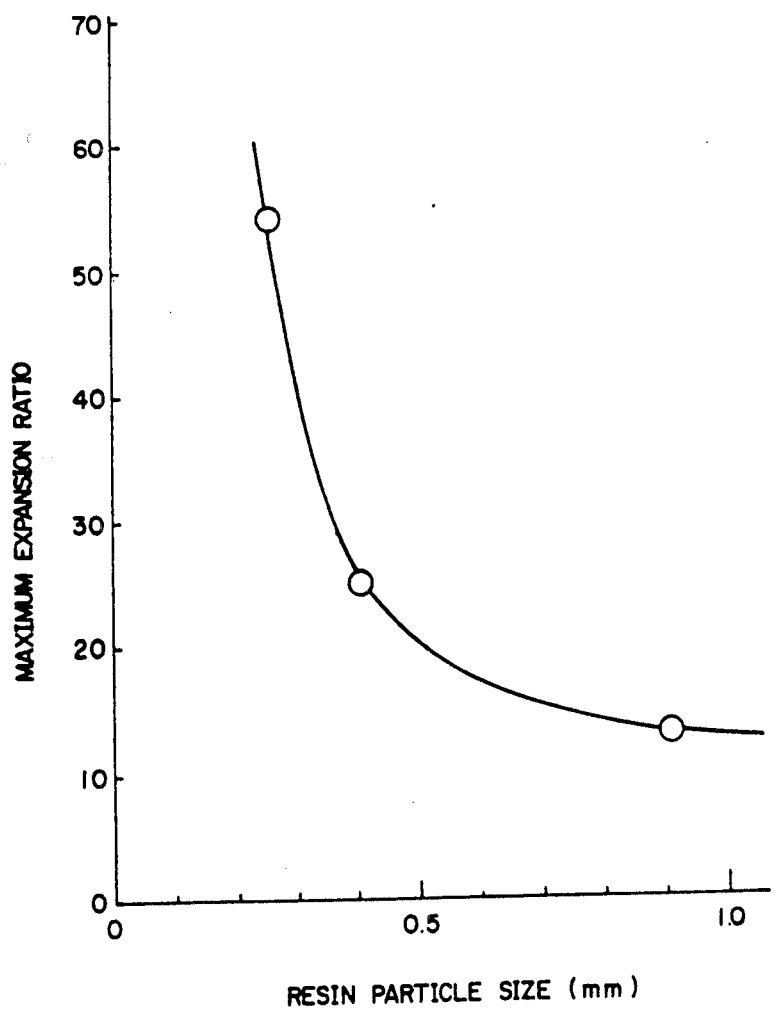
FIG. 2 is a graph showing the relationship between the particle size of the non-crystalline vinylidene chloride type resin particles and the maximum expansion ratio.

To describe now in detail about the present invention, by referring to the novel aspects of the in-mold foam molding of the present invention with respect to the salient features in processes for production thereof, which have rendered possible the matters impossible in the prior art, the essential requirements for the foam molding of the present invention are to be clarified below.

The salient features in processes for accomplishing the foam molding of the present invention may be summarized in the combination of the three points (1), (2) and (3) shown below:

(1) employment of a substantially non-crystalline vinylidene chloride type resin as the base resin;

(2) selection of a volatile organic blowing agent as the blowing agent, and employment of the contact impregnation with the blowing agent utilizing large magnitude of the specific surface area possessed by the fine resin particles as obtained by the suspension polymerization method for incorporation thereof in the resin; and (3) employment of the known molding method practiced for the in-mold expansion molding method with expandable resin particles (typically polystyrene expandable particles) for formation of the foam molding.

For convenience of description, the reasons for respective items (1), (2) and (3) are to be described below in this order.

First, the requirement (1) is essential because the use of a non-crystalline vinylidene chloride type resin surprisingly enables impregnation of a large amount of a blowing agent into the resin particles, and also allows the surface condition of the resin particles (including the internal structure) to permit the blowing agent to expand the resin particles into multi-cellular foam particles, and further permits the flowing viscoelastic characteristics of the resin near the expansion temperature to take a state suitable for expansion.

Referring now to FIG. 1(A) and FIG. 1(B), such a situation is to be described plainly. FIGS. 1(A) and 1(B) are electron microscope photographs showing the surface states of vinylidene chloride type resin paticles to be used for base resins, (A) being the substantially non-crystalline resin as mentioned in the present invention, while (B) being the crystalline resin for comparative purposes.

As can clearly be seen from a comparison between FIG. 1(A) and FIG. 1(B), the non-crystalline resin is free of interstices or cracks and relatively smooth on its surface, while the crystalline resin is formed of a mass of blocks having uneven surfaces to be gathered as a whole into a spherical mass, and interstices or cracks can be seen therein. Such states of both may be estimated to be the same also in the internal structure of the particles. Formation of the above-mentioned blocks may be considered to be due to crystallinity of the resin.

The non-crystalline resin particles of the above FIG. 1(A) can be impregnated with a large amount of blowing agent, and when they are expanded by heating with steam, a large number of bubble nuclei are formed to give highly expanded multi-cellular particles, and extrusion expansion thereof can give a highly expanded homogeneous expanded board enriched in closed cells. In contrast, the crystalline resin particles of FIG. 1(B) can be impregnated with only a small amount of blowing agent, and when they are expanded by, for example, heating with steam, they can be changed only a little and to an extent which cannot be said to be expanded.

Such a difference in phenomenon may probably be due to the fact that, in the non-crystalline resin particles, the blowing agent is impregnated in the form of being dissolved within said resin, while, in the crystalline resin particles, the blowing agent is contained through the voids or cracks. Accordingly, when the crystalline resin particles are attempted to be expanded by heating, the blowing agent will be dissipated through such cracks in a large amount, whereby the expanding ability of the blowing agent cannot sufficiently be utilized, and also crystallinity of the resin will interfere with the flowing elongation of the resin during the expansion process to make formation and growth of cells difficult.

Thus, the vinylidene chloride type resin to be used as the base resin for the expandable resin particles of the present invention is required to be substantially non-crystalline.

Next, FIG. 2 is a graph of experimental examples showing the relationship between the particle size of the resin to be used in the present invention and the maximum expansion ratio.

What is meant partially by FIG. 2 is that, in addition to employment of the non-crystalline resin of the above item (1), the above item (2), namely the contact impregnation method with the use of particles of small sizes, is also required.

Generally speaking, vinylidene chloride type resins have higher barrier characteristics for volatile blowing agents, particularly Freon type organic blowing agents, and it has been considered difficult to impregnate these resins with such blowing agents so as to obtain homogeneous multi-cellular products. Whereas, in the present invention, by selection of the resin as described above, and also by appropriately selecting the particle sizes of the resin particles and the temperature condition for impregnation, it is possible to accomplish impregnation of the blowing agent capable of high expansion under commercial conditions as shown in FIG. 2.

Also, as in the above item (2), by use of a volatile organic blowing agent, a large amount of the blowing agent can be impregnated into the resin particles, whereby a high degree of expansion was realized. In contrast, a decomposition type chemical blowing agent can be mixed with difficulty and dispersed uniformly in the resin particles. Further, by use of the contact impregnation between the resin particles and the volatile organic blowing agent, impregnation of the blowing agent can be effected efficiently at normal temperature to around the softening point of the resin particles and therefore deterioration or decomposition of the vinylidene chloride resin during impregnation can be avoided. Whereas, in the extrusion impregnation method, which is another useful method, decomposition of the resin will inevitably occur, because the resin is once molten by heating.

Figure 3:
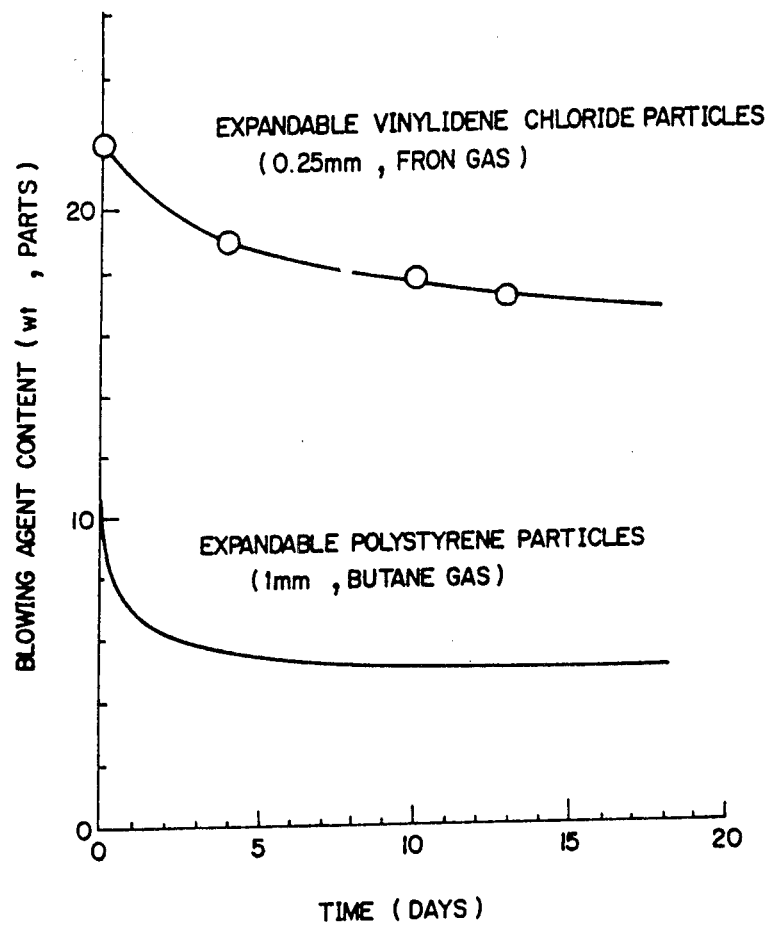
FIG. 3 is a graph showing retentivity of blowing agent of the expandable non-crystalline vinylidene chloride type resin particles according to the present invention and expandable polystyrene particles for comparative purpose.

FIG. 3 is a graph showing an example of retentivity (continuation) of the blowing agent (expandability) in the expandable resin particles of the present invention. The graph is noted as a phenomenon in which the presumption is denied that the comtinuation of expandability is improbable since the amount of the blowing agent dissipated will be greater in proportion to the specific surface area of the resin particles, if impregnation of the resin particles with the blowing agent is assumed to be effected only through the largeness of the specific surface area of the particles.

Figure 4:
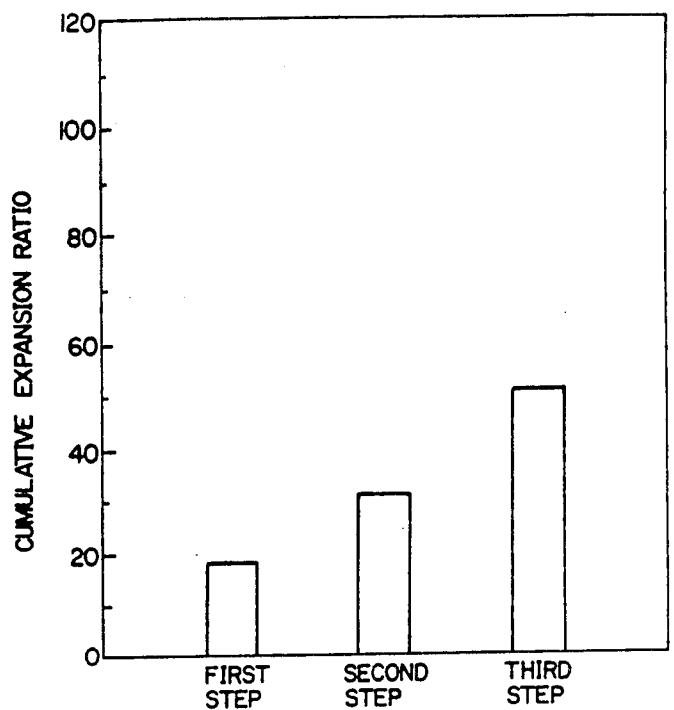
FIG. 4 is a graph showing the cumulative expansion ratio when the expandable non-crystalline vinylidene chloride type resin particles are expanded in three steps.

Further, FIG. 4 is a graph showing the expansion ratio in the respective steps in cumulative forms when the expandable resin particles of the present invention are expanded in three steps. This Figure shows that the blowing agent impregnated into the expandable resin particles can remain within the pre-expanded particles as the blowing agent unconsumed in the initial heating expansion, and also that the resin employed for the expandable resin particles has rheological properties which can stand expansion in multiple steps. Such a continuation of expandability may be estimated to be due to a phenomenon based on the special gas barrier characteristic possessed by the resin.

Figure 5:
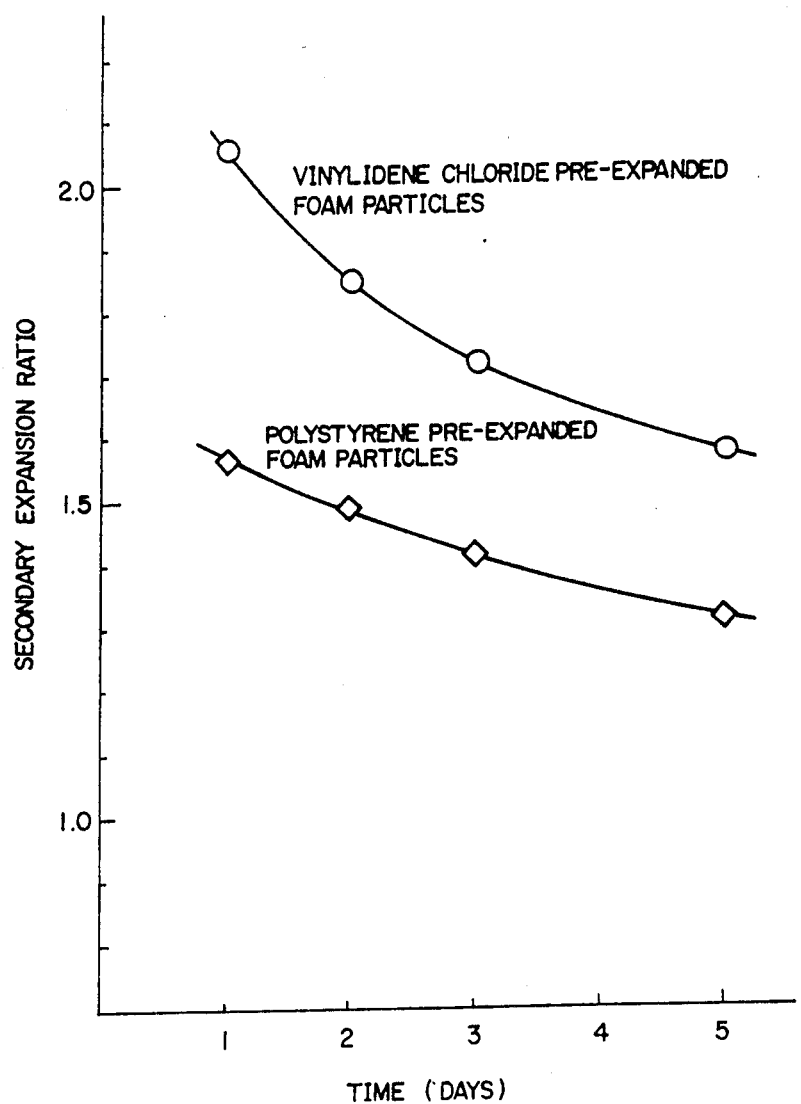
FIG. 5 is a graph showing the changes of the secondary expansion ratio with lapse of time of the pre-expanded foam particles of the non-crystalline vinylidene chloride type according to the present invention and the polystyrene pre-expanded foam particles for comparative purpose.

In addition to the above phenomena, a surprising phenomenon is shown in FIG. 5. FIG. 5 is a graph showing the change of re-expandability of the particles exhibited with lapse of time, when the resin foam particles as mentioned in the present invention which have been once pre-expanded are maintained in the air. The phenomenon exhibited by FIG. 5 may be considered to be a phenomenon in which the inner pressure of the blowing agent within the cells which must have been used in the initial expansion is restored to a pressure greater than the original pressure through the action of entraining the air, which is a very useful characteristic when obtaining expanded particles of a high expansion ratio or in the case of molding an in-mold expansion molding. It is a phenomenon which deserves special mention in the vinylidene chloride type resins clarified as a result of the investigation by the present inventors.

Whereas, the expandability possessed by the expandable particles as shown in FIG. 4 or the re-expandability possessed by the foam particles as shown in FIG. 5 is nothing but the ability which governs heating foaming (heating expansion) of the particles within a mold in the in-mold foam molding and close fusion among particles accompanied therewith, and clarification of the expandability has enabled employment of the in-mold foam molding method. Further, by virtue of such an expandability, foam moldings of various shapes and structures, with various densities, can be obtained with ease.

The above item (3), namely the use of the in-mold foam molding method is essentially required, because the vinylidene chloride type resin, which is liable to be thermally decomposed, can be heated uniformly and very efficiently at lower temperature and within a shorter period without bringing about a broad residence time distribution, thereby avoiding complete thermal decomposition of the resin, to convert the resin into a foam molding.

The in-mold molding employed herein is the method, in which a mold cavity (known and called generally as the mold cavity which can be closed but is not sealed) is filled with expandable resin particles or pre-expanded foam particles, which are heated externally of the mold walls with a fluid such as steam through small perforations to be expanded, thereby filling the voids among the particles to effect fusion, followed by quenching, to form a molding.

During these operations, since the expandable resin particles of this invention employ a non-crystalline resin as shown in the above (1), having a Vicat softening point lower by about 50° to 60° C. or more than the crystalline resin of the prior art, heating molding with steam of 120° C. or lower conventonally used in in-mold molding is fairly possible, and the foaming temperature can be set at a temperature far lower than the decomposition temperature of the resin.

Further, in the expandable resin particles of the present invention, as shown by the above item (2), fine resin particles obtained by suspension polymerization are employed and impregnated with a blowing agent according to the contact impregnation method, whereby no such heating melting or mechanical shear as required in the extrusion impregnation method is necessary to cause substantially no denaturation or thermal decomposition of the resin. Also, it is not necessary to add plasticizers or thermal stabilizers, conventionally used for prevention of such denaturation or thermal decomposition. As the result, foam moldings can be obtained having inherent properties substantially unchanged from the vinylidene chloride type resin such as gas barrier property or flame retardancy.

As described above, the in-mold foam molding of the present invention is a novel product, which has been completed according to the preparation method as summarized by the above items (1), (2) and (3).

The molding of the present invention is described in detail below.

FIG. 6 is an enlarged schematic illustration of the cross-section of the molding of the present invention, which is shown by the electron microscope photograph of the cross-section when it is fractured, for better understanding of its structure.

The molding of the present invention as shown in FIG. 6 is a mass of a large number of multi-cellular particles (particles formed by expansion of expandable particles and foam particles) made of a substantially non-crystalline vinylidene chloride type resin as the base resin, having a structure such that said particles are fused closely to the outer surfaces of the adjacent particles to be integrated into a foam molding. This structure is nothing but the correct expression of the specific features of the in-mold molding method as described in detail above which has completed the molding of the present invention.

Figure 7:
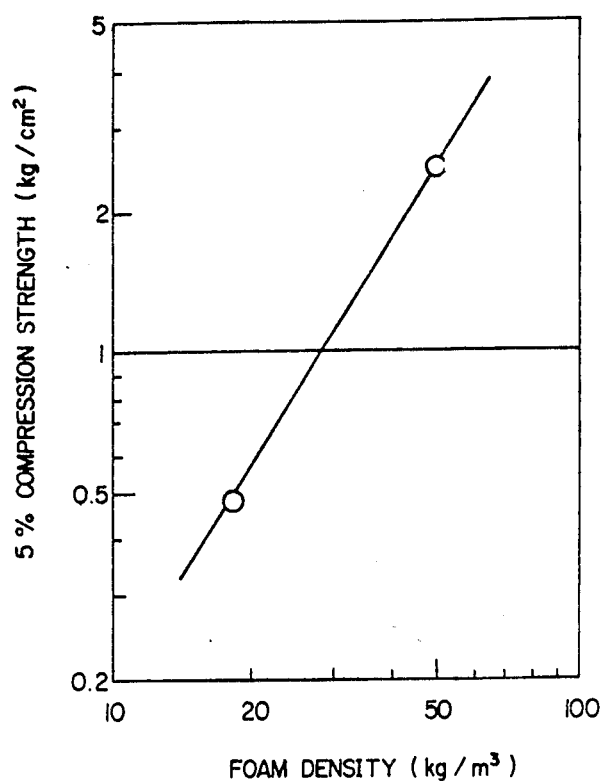
FIG. 7 is a graph showing the relationship between foam density and 5% compression strength of the foam molding of the present invention.
Figure 8:
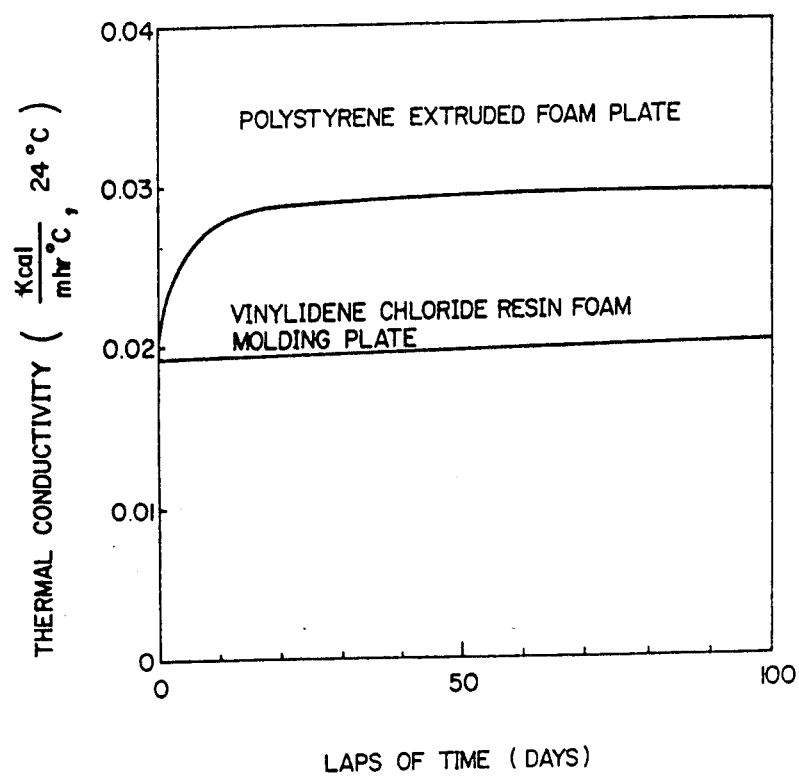
FIG. 8 is a graph showing the changes in thermal conductivity with lapse of time of the expansion molded board of the vinylidene chloride type resin of the present invention and the polystyrene extrusion expanded board for comparative purpose.
Figure 9:
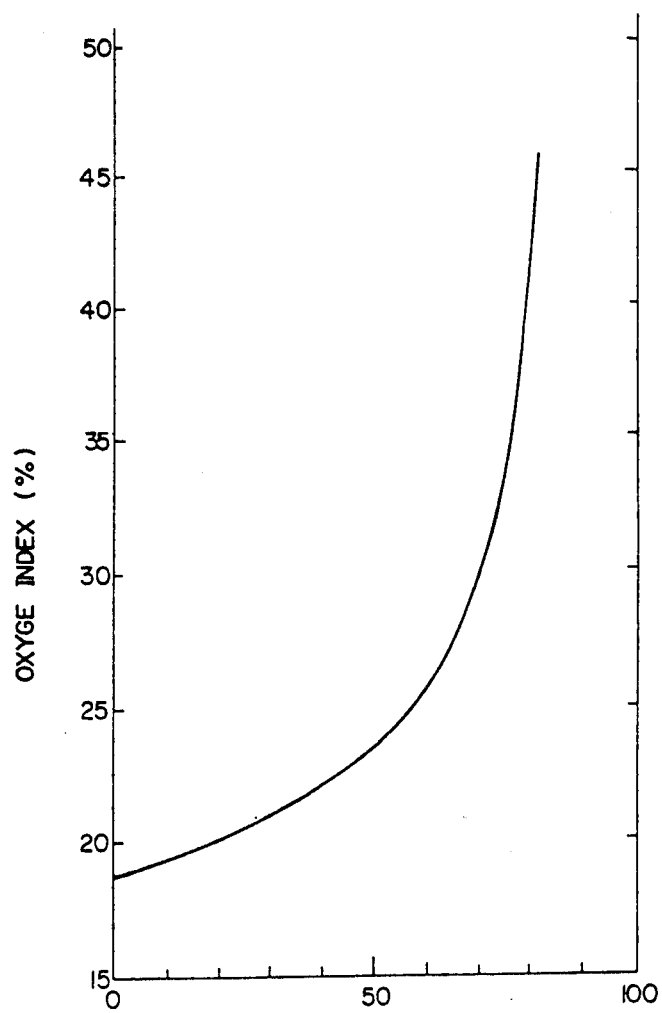
FIG. 9 is a graph showing the relationship between the vinylidene chloride content in the resin in the case of a copolymer resin of vinylidene chloride and methyl methacrylate and the oxygen index.

FIGS. 7, 8 and 9 are typical examples of the characteristics exhibited by the molding of the present invention, FIG. 7 showing an exemplary graph of the relationship between foam density and compression stress necessary for 5% compression, FIG. 8 an exemplary graph of the retentivity of the insulating performance exhibited by the molding of the present invention and FIG. 9 an exemplary graph of flame retardancy performance (oxygen index) exhibited by the base resin of the present invention.

All of these characteristics are exhibited here without alteration of the characteristics of the vinylidene chloride type resin by thermal decomposition or denaturation, as reflected by the specific features of the process of the present invention selected to give such effects, thus making the molding of the present invention useful in industry.

More specifically, FIG. 7 shows that the molding of the present invention can be provided as a foam with a broad density range, indicating the possibility of complying with the requirement of various compression strengths which are different depending on uses. Also, the excellent compression strength per density is a characteristic which has been achieved by the molding of the present invention, which is a mass of multi-cellular particles.

FIG. 8 illustrates an example, showing usefulness of the molding of the present invention when employed as a board for thermal insulation. For comparative purposes, a polystyrene extruded foam board which is reputed to be excellent in insulating performance is also shown, but it can be seen that the molding of the present invention can retain excellent insulating characteristics for a long term. The insulating performance may be variable in its level of absolute value depending on the sizes of the cells constituting the molding or the gas held in the foam molding, but it has been confirmed according to experiments by the present inventors that a molding having insulation up to 0.018 to 0.028 [kcal/m.hr.°C.] in terms of thermal conductivity at density around 40 Kg/m$^3$ can be obtained.

FIG. 9 suggests the advantage that a foam molding having flame retardancy can provide without using specifically a flame retardant for preparation of the molding of the present invention. This is one of the advantages obtained as the result of utilizing the characteristics possessed by the base resin as such.

Further, still another advantage derived from the method for prepration of the molding of the present invention is the advantage of latitude in setting the thickness or dimension, the surface area of a cross-section and the shape of the molding. According to the experiments by the present inventors, a foam molding, for which a mold cavity can effectively be prepared, for example, with dimensions of about 3 mm or longer and a cross-sectional area of 9 mm$^2$ or larger, can freely be produced. Even within the scope of the experiments, a block with a thickness of 100 mm, a width of 900 mm and a length of 1800 mm can be easily molded, thus indicating a possibility that a molding with freely selected dimensions and shapes can be prepared depending on the design of the mold.

In the following, some details about the molding, the expandable particles, foam particles as mentioned in the present invention and prepartions thereof are to be supplemented.

The vinylidene chloride type resin as herein mentioned refers comprehensively to copolymeric resins of vinylidene chloride with at least one of the comonomer components copolymerizable therewith. The copolymerizable comonomers are disclosed in Polymer Handbook, 2nd edition, edited by Brandrup & Immergut, including, for example, styrene, vinyl acetate, vinyl chloride, vinyl bromide, acrylonitrile, methacrylonitrile, acrylic acid, methacrylic acid, methyl acrylate, ethyl acrylate, butyl acrylate, methyl methacrylate, ethyl methacrylate, ethylene, methylpropylene, methylbutene and others.

In general, the designation "vinylidene chloride type" is commonly accepted to refer to copolymers in which vinylidene choride units exist at a proportion of 50 wt. % or more, because the characteristics of the vinylidene chloride units as the main component will dominate the characteristics of the copolymer resin itself. In such a sense, among the vinylidene chloride type resins to be used for the foam molding of the present invention, those containing 50 wt. % or more of vinylidene chloride units are preferable resins, since the resultant foam moldings can effectively exhibit the characteristics such as insulating performance and flame retardancy. However, in the foam molding of the present invention, even when the base resin contains a small amount of vinylidene chloride units, specifically about 10 wt. % (desirably 30 wt. % or more), the resultant foam molding can be endowed with flame retardancy and insulating performance, as compared with the resin containing no such component. Thus, from such facts, the concept of the vinylidene type resin is defined comprehensively so as to extend far beyond the range as commonly accepted.

Further, the vinylidene chloride type resin to be used in the present invention is required to be non-crystalline. The term "non-crystalline" is the antonym against the ordinary "crystalline", and a non-crystalline resin may be defined, for example, as a resin which exhibits no peak value as exibited by the temperature for crystal melting or crystal formation when the crystal temperature of the resin is measured according to the DSC (Differential Scanning Calorimetry). However, in the present invention, the resins incorporating a small amount of crystalline components or additives incorporated in the non-crystalline resins, for the purpose of, for example, controlling cell sizes of the foam particles or other purposes, are also included within the substantially non-crystalline resin as mentioned in the present invention, provided that they do not alter the technical thought of "utilizing the characteristics of the non-crystalline resin for completion of expandable resin particles".

The above non-crystalline vinylidene chloride type resin can be produced according to various method such as mass polymerization, emulsion polymerization, suspension polymerization, etc. but it is preferred as mentioned above to use suspension polymerization, from the standpoint of avoiding thermal decomposition or preparing readily resin particles with particles sizes necessary for obtaining the expandable resin particles of the present invention, namely an average particle size of 0.05 to 5 mm.

In the vinylidene chloride type resins, transition from crystallinity to non-crystallinity occurs as the ratio of the comonomer units relative to vinylidene chloride units is increased. The ratio of the comonomer units at which such a transition occurs depends on the comonomer employed, but in the non-crystalline vinylidene choride type resins of the present invention, the comonomer units may be contained generally at a proportion of 5 to 10 wt. % or more, or 30 wt. % or more at the highest.

And, as the vinylidene chloride type resin to be used in the present invention, it is preferred to use a copolymer of vinylidene chloride and an acrylic monomer. When the target foam molding is desired to be high in expansion ratio and enriched in rigidity and heat resistance, it is desirable to use a copolymer of vinylidene chloride and methyl methacrylate with a content of methyl methacrylate in the copolymer of 30 wt. to 90 wt. %.

Further, by using as the crosslinking component, for example, divinylbenzene or a polyethylene glycol esterified at both ends with acrylic acid, or by incorporating glycidyl methacrylate and methacrylic acid as a part of the monomer components, a crosslinked noncrystalline vinylidene chloride type resin can be obtained. When such resin particles are used, in-mold moldability is good and the resultant foam molding is enriched in closed cellular structure to be improved in compression strength and thermal conductivity.

The resin particles to be used for the expandable resin particles of this invention may be have the shapes of the resin particles as such obtained by suspension polymerization as mentioned above, and they are ordinarily spherical or approximate thereto. Their sizes should be chosen in connection with the impregnation rate of the blowing agent, retentivity of expandability in the expandable resin particles, the in-mold dimensional shape to be employed and the in-mold heating efficiency, and those with an average particle size from 0.05 to 5 mm are used in the present invention. In view of making the above connection well balanced as a whole, it is desirable to use particles which are as regular as possible with an average particle size from 0.1 to 1 mm.

Further, from the standpoint of wishing to choose a resin suited for in-mold steam expansion molding from among substantially non-crystalline resins obtained, it is desirable to use the Vicat softening point of the resin as one of the indices. Those resins generally have Vicat softening points of 120° C. or lower, but the use of a resin having a Vicat softening point within the range of from 60° to 100° C. is preferred, because the fusing force among particles in the molding is dense and a molding with excellent surface smoothness can be obtained.

The blowing agent to be used for the expandable resin particles of the present invention is a volatile organic blowing agent having a boiling point lower than the softening point of the resin employed. The blowing agent may be determined in view of the compatibility with the resin, the vapor pressure at the foaming temperature, and the boiling point of the blowing agent. When the target conditions cannot be satisfied by one blowing agent, two or more blowing agents can be mixed to prepare a blowing agent suitable for expansion of the resin. In this case, from the point of view of the compression strength or the elasticity of the foam molding, it is preferred to use an aliphatic hydrocarbon or an aliphatic halogenated hydrocarbon having a boiling point of 60° C. or lower. On the other hand, from the point of view of compatibility between the resin and the blowing agent, it is preferred to use a blowing agent having an average solubility parameter (SP value) within the range of 5.7 to 7.0.

Examples of blowing agents may include aliphatic hydrocarbons such as propane (SP value=6.4), butane (6.8), isobutane (6.8), pentane (7.0), isopentane (6.7), neopentane (6.3) and the like; halogenated hydrocarbons such as methyl chloride (9.7), ethyl chloride (9.2), methylene chloride (9.7), trichloromonofluoromethane (7.6), dichlorodifluoromethane (5.5), dichloromonofluoromethane (8.3), monochlorodifluoromethane (6.5), trichlorotrifluoroethane (7.3), dichlorotetrafluoroethane (6.2), monochlorodifluoroethane (6.8), difluoroethane (7.0) and the like.

The solubility parameters (SP values) written in the parenthesis are values disclosed in Polymer Handbook, Second Edition, ed. by J. Brandrup and E. H. Immergut (1974), and those not disclosed in the above literature were cited from other literatures or calculated from the following formula at 25° C.:

$$(SP \text{ value})^2 = \frac{d}{M} (\Delta H - RT)$$

where
d: density (g/cc)
M: molecular weight (g/mol)
ΔH: evaporation latent heat (cal/mol)
R: gas constant (cal/mol. °K)
T: absolute temperature (°K).

In the case of a mixed blowing agent, the molar average solubility parameter, which is the sum of the products of the solubility parameters of respective components multiplied by their molar ratios, is used.

Figure 10:
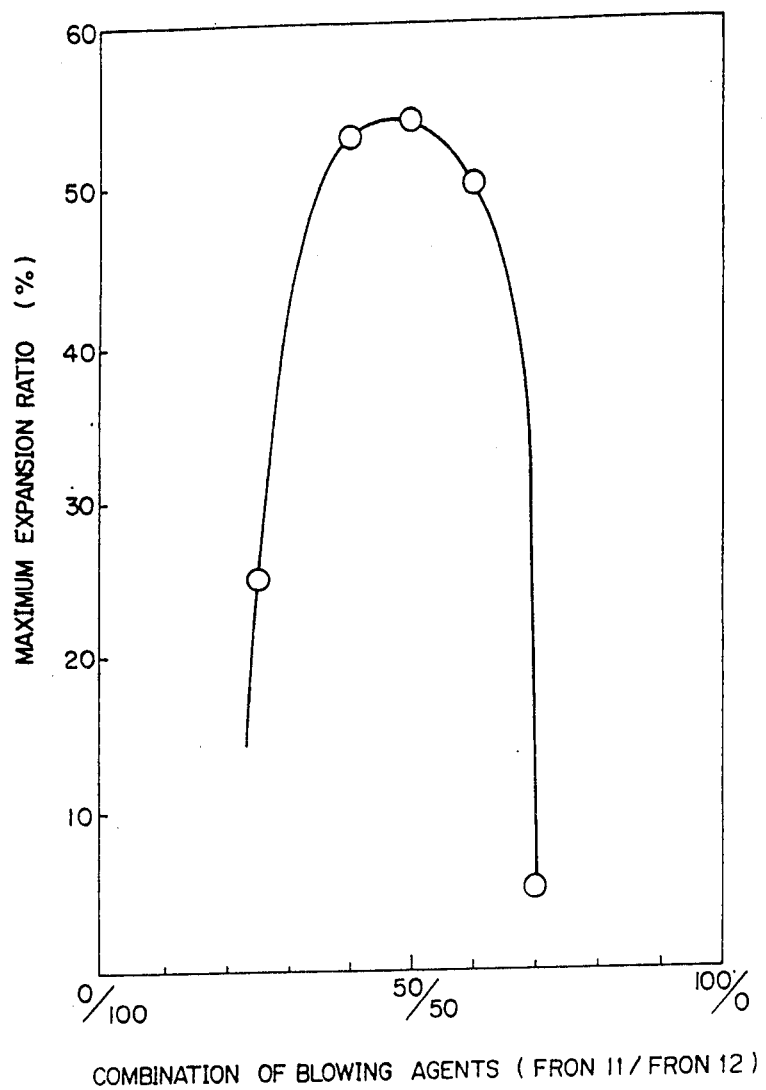
FIG. 10 is a graph showing the relationship between the blowing agent composition ratio of Freon 11 to Freon 12 and the maximum expansion ratio.

FIG. 10 shows an example of the case when two or more blowing agents are mixed to prepare a blowing agent suitable for expansion. FIG. 10 shows the relationship between the mixing ratio of the blowing agents and the maximum expansion ratio of the foam particles obtained by use thereof, when a mixed blowing agent of Freon 11 (trichloromonofluoromethane, SP value 7.6) and Freon 12 (dichlorodifluoromethane, SP value 5.5) is employed as the blowing agent. The axis of the abscissa indicates the mixing ratio (by weight) of both blowing agents and the axis of the ordinate the maximum expansion ratio.

From this Figure, it can be seen that a good foam molding cannot be obtained by the mixed blowing agent of Freon 11 and Freon 12, unless its weight ratio falls within the range of 20-70:80-30 (SP value 5.8-6.9). Thus, it can be understood that selection of the blowing agent or mixing ratio of the blowing agents is an important factor for obtaining a good foam molding, and they play important roles for completion of the expandble resin particles of the present invention.

Also, when a Freon type blowing agent is used, coupled with the gas barrier property possessed by the resin, retentivity of expandability in expandable resin particles becomes greater, and moreover there is still another advantage that the foam molding obtained is excellent in thermal insulating performance. This may be considered to be due to the insulating effect of Freon gas itself.

As the method for incorporating the above blowing agent into resin particles, there may be employed, for example, the gas phase or liquid phase impregnation method, in which the resin particles are impregnated in an autoclave with a liquid or gaseous blowing agent, under heating or pressurization if desired, or the in-water suspension impregnation method in which the resin particles suspended in water are impregnated with a blowing agent. It is also possible to obtain directly expandable resin particles by carrying out polymerization in the presence of a blowing agent.

In the expandable resin particles of the present invention, the amount of the above blowing agent employed, which can be selected suitably depending on the desired density of the target foam (foam particles, foam molding), may be generally within the range of from 1 to 40 parts by weight per 100 parts by weight of the resin particles.

Generally speaking, when the blowing agent employed is the same, the thermal insulating performance of the foam obtained is known to be better as the density is lower, the cell size is smaller, and the closed cell percentage is higher. For example, by use of an appropriate mixed blowing agent as shown in FIG. 10, it is possible to obtain freely a molding enriched in homogeneous closed cells with cell sizes within the range of from about 0.01 to 1 mm.

The foam particles of the present invention can be obtained by permitting the expandable resin particles to expand by heating with steam, etc. The foam particles are useful, for example, as light weight filler cushioning materials and filler insulating materials excellent in oil resistance, chemical resistance as well as flame retardance, or floating materials for aerating cleaning of water, etc. However, in the present invention, it is more general that the foam particles should be provided for in-mold expansion molding. Its advantage is more marked when the desired expansion ratio of the molding is higher (lower density), and the quality of the moldings obtained can be more uniform, as compared with the case when employing expandable resin particles as the starting material. Accordingly, the expansion ratio of the foam particles is generally selected from the range of from 4 to 150-fold corresponding to the target expansion ratio of the molding. In this case, when the closed cell percentage in the foam particles is less than 65%, fusion among the foam particles during in-mold molding may be lowered or the insulating property of the molding may be worsened, and therefore it is preferred to employ foam particles enriched in closed cell percentage, generally of 65% or more, preferablye 80% or more.

As described above, the present invention can provide novel foam materials to industry and thus it is a very significant invention.

The present invention is described in more detail by referring to the following Examples, by which the present invention is not limited.

The respective physical properties and performances were evaluated according to the methods shown below:
(1) Foam density: based on JIS K 6767;
(2) Expansion ratio: determined by dividing the base resin density by the foam density;
(3) Cell size: based on JIS K 6402;
(4) Closed cell percentage: based on ASTM D2856;
(5) 5% Compression strength: based on ASTM D1621, and the compression strain is made 5%;
(6) Combustion test: based on JIS A 9511, and the test strip is held horizontal;
(7) Vicat softening point: based on ASTM D1525;
(8) Oxygen index: based on ASTM D2863.

EXAMPLE 1

Copolymer resin particles with an average particle size of 0.25 mm and a weight ratio of vinylidene chloride unit/methyl methacrylate unit of 60/40 obtained by suspension polymerization were provided for the experiments. The resin had a specific gravitiy of about 1.49, which was a non-crystalline resin exhibiting no peak at all in DSC (by use of DSC-18 series GC, produced by Perkin Elmer Co., at a temperature gradient of 10° C./min.), and had a Vicat softening point of 70° C. The solution viscosity in a 1 wt. % solution of the resin dissolved in tetrahydrofuran at 30° C. was 1.4 centipoise. The electron microscope photograph of the resin particles is shown in FIG. 1(A). From this photograph, it can be observed that the surfaces of the resin particles are smooth and free from interstices.

First, the resin particles are placed in an autoclave and hermetically sealed, followed by evacuation to vacuum. Then, a liquid mixture of blowing agents containing Freon 11 and Freon 12 at equal weight ratios was charged into the autoclave until the resin particles were submerged beneath the liquid level. After leaving the system to stand under this state at 70° C. (under an inner pressure of 11.4 Kg/cm$^2$-gauge), followed by cooling to 20° C. to bring the atmosphere to normal pressure, the particles in the autoclave were taken out. As calculated from weight measurements of the particles before and after impregnation, the resin particles were found to be impregnated with 22 parts by weight (per 100 parts by weight of the resin, hereinafter the same) of the blowing agents.

The particles impregnated with blowing agents were left to stand openly in a room, and the weight change was monitored for evaluation of the retentivity of the blowing agents. The results are shown in FIG. 3. For comparative purposes, the results for the expandable polystyrene beads of 1 mm in diameter impregnated with 11 parts by weight of butane gas placed under the same standing conditions are also shown in FIG. 3. As seen from this Figure, the vinylidene chloride resin pariticles have very excellent blowing agent retentivity (absolute value and retentivity percentage).

The above particles, immediately after impregnation with blowing agents, which were lightly fused together, were loosened and placed in a steam expanding machine to be expanded by heating. The heating expansion was carried out by use of steam of 0 Kg/cm$^2$ (guage pressure) successively in three steps. The cumulative expansion ratios of the resin particles, when conducting the primary expansion at the first stage fro 20 seconds, the secondary expansion at the second stage for 20 seconds, and the tertiary expansion at the third stage for 20 seconds, are shown in FIG. 4. As can be clearly seen from this Figure, even the pre-expanded particles, once expanded, have further subsequent potential expandability maintained therein.

For the next step, the above expandable particles were left to stand openly in a room for 2 weeks after impregnation with blowing agents, and thereafter subjected to heating expansion with steam of 0 Kg/cm2 for 34 seconds. As the result, pre-expanded foam particles with an expansion ratio of 30-fold were obtained. Subsequently, secondary expandability of these foam particles, when left to stand in a room and heated for re-expansion periodically by heating with the same steam for 30 seconds, was monitored. The results of the secondary expansion ratios divided by the pre-expansion ratios are shown in FIG. 5. For comparative purpose, the results for the expandable polystyrene beads as previously described are also shown in the same Figure. As seen from the Figure, the pre-expanded particles according to the present invention can be understood to have a high secondary expanding capacity, even when compared with the polystyrene foam particles which have been known to have excellent secondary expandability.

Next, the above pre-expanded particles of a 30-fold expansion ratio (closed cell percentage 98%, average particle size 0.8 mm) were aged one day in a room and molded in an in-mold steam molding machine for expandable polystyrene. The cavity employed was a cavity which can be closed but not sealed and made of walls having a large number of slit-like interstices with widths of 0.2 mm and lengths of 7 to 10 mm. Into this cavity, the above pre-expanded particles were blown on an air stream to be filled therein. The foam particles were filled at a filling percentage of 60% (with the void percentage being 40%). Then, through the above interstices, steam was supplied from outside of the cavity walls at a gauge pressure of 0.9 Kg/cm$^2$ to heat the foam particles for further expansion, whereby the voids among the foam particles were filled through fusion, followed by quenching with cooling water of 20° C. for solidification to provide a molding. The molding obtained was a flat plate of 300 mm square with a thickness of 25 mm, having a density of 30 kg/m$^3$ (expansion ratio 50-fold) and a closed cell percentage of 92%.

The molding was found to have a smooth surface and reproduce faithfully the mold cavity, even reproducing clearly a depression engraved on the cavity surface of 3 mm in width, 3 mm in depth and 10 mm in length.

FIG. 6 shows an enlarged view of the fractured cross-section when this foam molding was torn out by hand. From this Figure, it can be observed that a large number of particles foamed into a multi-cellular foam are fused together closely with adjacent particles to form a cross-section of the foam. The cell sizes can be observed to be about 0.1 mm on an average.

Next, of the foam particles at the three stages in FIG. 4, the foam particles of the first stage and the third stage were molded similarly to obtain flat foam moldings of the same dimension as described above with densities of 50 Kg./m$^3$ (expansion ratio 29-fold) and 18 Kg/m$^3$ (expansion ratio 80-fold), respectively. The results of 5% compression strengths of these moldings measured are shown in FIG. 7, from which it can be seen that foam moldings having desired compression strengths can be obtained by suitably controlling the density of the foam according to the method as described in the present invention.

FIG. 8 shows the results of the change in thermal conductivity monitored with lapse of time of the above flat plate with a density of 50 Kg/cm². For comparison, the results for the polystryene extruded foam plate, which has been deemed to be excellent in thermal conductivity, are also shown. As is clear from this Figure, the foam of the present invention exhibits a thermal conductivity far smaller than that of polystyrene, and yet it has good retentivity of the blowing gas, whereby low thermal conductivity can be maintained as such.

For all of the above foams, combustion tests were conducted to reveal that they exhibited self-extinguishing characteristics.

Next, in this Example, the resin particles with about 0.25 mm, 0.4 mm and 0.9 mm, respectively, were impregnated with blowing agents under the same conditions as described above, and then subjeced to heating expansion with steam of 0 Kg/cm², and the maximum expansion ratios reached were determined and plotted versus the particle sizes, of which results are shown in FIG. 2. As can be seen from this Figure, the resin particles according to the foam of the present invention can more rapidly be impregenated with blowing agents and with better retentivity thereof as the particle size is smaller, and consequently gives a higher degree of expansion.

Also, in this Example, the composition ratio of the mixed blowing agents Freon 11/Freon 12 to be impregnated into the resin particles was changed as 25/75 (molar average SP value 6.0), 40/60 (6.3), 50/50 (6.5), 60/40 (6.7) and 70/30 (6.9), and the resin particles with an average particle size of 0.25 mm were impregnated with these compositions similarly as described above to obtain foam particles, which were then subjected to heating expansion with steam of 0 Kg/cm². FIG. 10 shows the relationship between the maximum expansion ratio reached and the blowing agent composition obtained in these experiments. From this Figure, it can be seen that the foam particles of the present invention exhibit very high expansion ratios, provided that the blowing agent composition is within a preferable range.

COMPARATIVE EXAMPLE

Vinylidene chloride type resin particles with an average particle size of 0.15 mm comprising 80 wt. % of vinylidene chloride units and 20 wt. % of vinyl choride units were provided for the experiments. This resin exhibited crystallinity, indicating a peak at 160° C. on melting in DSC. Its Vicat softening point was 131° C. The enlarged photograph of these resin particles by an electron microscope is shown in FIG. 1(B). From this Figure, it can be seen that the resin particle surfaces and internal portions thereof are porous.

The above resin particles were impregnated in entirely the same manner as in Example 1 with mixed blowing agents of Freon 11/Freon 12 at various composition ratios. From measurements of the weights before and after impregnation, the resin particles were found to be impregnated with 8 parts by weight of the blowing agents.

Various expansions were attempted to be effected for these particles containing blowing agents by varying the steam pressure from 0 Kg/cm² to 1.5 Kg/cm², but no expansion occurred at all. Further, by use of a silicone oil, these particles containing blowing agents were placed in the heated silicone oil by varying the temperature from 120° C. to 170° C. As the result, only bubbles were generated and no substantial foaming of the particles occurred.

EXAMPLE 2

Copolymer particles with an average particle size of 0.25 mm, comprising 30 wt. % of vinylidene chloride units and 70 wt. % of methyl methacrylate units were impregnated with a mixed blowing agent of Freon 11/Freon 12 at a weight ratio of 1/1, in the same manner as in Example 1.

The base resin was non-crystalline, indicating no peak at all in DSC, and had a Vicat softening point of 89° C.

The above expandable particles had an impregnated blowing agent content of 27 parts by weight, and they were left to stand at room temperature for 2 weeks and then heated with steam of 0 Kg/cm² for 60 seconds to obtain pre-expanded foam particles with an expansion ratio of 46-fold and a closed cell percentage of 98%. After aging for one day, following the same procedure as in Example 1, these foam particles were subjected to in-mold steam expansion molding to give a flat plate foam molding with an expansion ratio of 73-fold.

This molding had a cross-section, in which a large number of multi-cellular particles were fused together in close contact with adjacent particles. This foam molding had a smooth surface and it can be used as such for plates for insulating materials or cushioning materials.

EXAMPLE 3

Vinylidene chloride type particles with an average particle size of 0.15 mm, comprising 60 wt. % of vinylidene chloride units and 40 wt % of methyl acrylate units were impregnated with a mixed blowing agent of Freon 11/Freon 12 at a weight ratio of 1/1, in the same manner as in Example 1.

The base resin was non-crystalline, indicating no peak at all in DSC, and had a Vicat softening point of 52° C.

The above expandable particles had an impregnated blowing agent content of 24 parts by weight, and they were expanded in heated air at 60° C. to obtain highly expanded foam particles with an expansion ratio of 61-fold and a closed cell percentage of 96%, which can be used as fillers. Also, the above foam particles were left to stand openly in a room for 2 weeks and thereafter filled horizontally and uniformly in a cavity, of which the flat portion was held horizontal, to an apparent volume of 10%, followed by heating, expansion and molding with a gas mixture of steam and air controlled to 65° C., to give a flat foam molding with a density of 96 Kg/cm².

EXAMPLE 4

Vinylidene chloride type resin particles with an average particle size of 0.25 mm, obtained by copolymerization by further adding 3 parts by weight of glycidyl methacrylate to give a crosslinked structure and 0.3 part of methacrylic acid to 100 parts by weight of the starting monomers comprising 60 wt. % of vinylidene chloride units and 40 wt. % of methyl methacrylate units were provided for experiments.

Similarly as in Example 1, by varying the composition of the mixed blowing agents comprising Freon 11 and Freon 12, the optimum composition was determined to give the result that the maximum expansion ratio was exhibited at the Freon 11/Freon 12 weight ratio of 7/3. The content of the blowing agents impregnated was 23 parts by weight. The particles impregnated with the blowing agents were left to stand openly in a room for 2 weeks and thereafter expanded with steam of 0.3 Kg/cm² for 30 seconds. As the result, pre-expanded foam particles with a density of 62 kg/m³ and a closed cell percentage of 98% were obtained. These particles were aged openly in a room for one additional day, and then subjected to in-mold steam molding similarly as in Example 1 to obtain a foam molding with a flat surface having a density of 40 Kg/m³. The 5% compression strength of this foam molding was measured to be 2.8 Kg/cm². From FIG. 7, it may be estimated that the 5% compression strength at the density of 40 Kg/cm² when having no crosslinking element is 1.7 kg/cm², and therefore it can be understood that the compression strength can be improved to a great extent by imparting crosslinking to the base resin.

EXAMPLE 5

Vinylidene chloride type resin particles with an average particle size of 0.4 mm, having a Vicat softening point of 75° C., prepared by copolymerization of 50 parts by weight of vinylidene chloride, 50 parts by weight of methyl methacrylate, 3 parts by weight of glycicyl methacrylate and 0.6 part of methacrylic acid were provided for experiments.

These particles were impregnated in an autoclave with a mixed blowing agent (molar average SP value 5.9) comprising 70 wt. % of Freon 12 (dichlorodifluoromethane, SP value 5.5) and 30 wt. % of Freon 22 (monochlorodifluoromethane, SP value 6.5). The blowing agent content impregnatd immediately after removal from the autoclave was found to be 27 parts by weight per 100 parts by weight of the resin. The expandable particles were left to stand in air for 7 days, wherby the content of the blowing agent contained became 16.9 parts by weight per 100 parts by weight of the resin, whereupon the particles were subjeced to heating expansion with steam of 1.2 Kg/cm²-gauge for 30 seconds to give foam particles with an expansion ratio of 65-fold (density 22 Kg/m³) and a closed cell percentge of 98%. On the other hand, when heated with steam of 0 Kg/cm²-gauge, foam particles with an expansion ratio of 22-fold (density 65 Kg/m³) and a closed cell percentage of 98% were obtained. The pre-expanded foam particles, without aging in the air, were quickly subjected to expansion by means of a steam molding machine for expandable polystyrene similarly as described in Example 1, whereby a flat plate foam molding of 300 mm square and a thickness of 25 mm, with an expansion ratio of 35-fold (density 41 Kg/m³) and a cell size of 0.1 mm, could be obtained. This flat plate had a 5% compression strength of 2.6 Kg/cm2 and a thermal conductivity at 24° C. of 0.018 Kcal/m.hr.°C.

As described in detail above, the present invention, by having the constitution as described above, provides a foam enjoying the characteristics possessed by a vinylidene chloride type resin (e.g. flame retardancy, gas barrier property, mechanical strength, etc.) with a shape and dimensions, which can be used as such for plates for insulating materials, vessels for cushioning, floating materials, etc. The in-mold foam molding can be supplied as moldings having good dimensional precision as well as smooth flat condition with free shapes and dimensions, including from complicated surface shapes to flat plates with various dimentions, depending on the design of the mold cavity, and it is also excellent in mechanical characteristics such as resilience, compression strength, etc. Thus, it is a foam which can contribute much to industries. Particularly, when it is is used as thermal insulating material, it is excellent in insulating performance, in retentivity of its performance and flame retardance. Accordingly, the present invention is very significant in providing novel foam materials to industries.

We claim:

1. Expandable vinylidene chloride type resin particles, comprising substantially non-crystalline vinylidene chloride type resin particles with an average particle size within the range of from 0.05 to 5 mm, which are smooth on the particle surfaces without interstice and which are impregnated with a volatile organic blowing agent wherein said volatile organic blowing agent is a single substance or a mixture of two or more compounds selected from aliphatic hydrocarbons having boiling points not higher than 60° and aliphatic halogenated hydrocarbons having boiling points not higher than 60° and its molar average solubility parameter (SP value) is within the range of from 5.5 to 9.7.

2. Expandable vinylidene chloride type resin particles according to claim 1, wherein said vinylidene chloride type resin is crosslinked.

3. Expandable vinylidene chloride type resin particles according to claim 1 or claim 2, wherein the average particle size is within the range of from 0.1 to 1 mm.

4. Expandable vinylidene chloride type resin particles according to claim 1 or claim 2, wherein said vinylidene choride type resin is a copolymer of vinylidene chloride and methyl methacrylate, the content of vinylidene chloride units in the copolymer is within the range of from 10 to 70 wt. % and said resin has a Vicat softening point within the range of from 55° to 110° C.

5. Expandable vinylidene chloride type resin particles according to claim 5, wherein the volatile organic blowing agent is composed mainly of a mixed blowing agent of trichloromonofluoromethane and dichlorodifluoromethane, and its weight ratio is within the range of from 20–70:80–30.

6. Expandable vinylidene chloride type resin particles according to claim 5, wherein the polatile organic blowing agent is composed mainly of a mixed blowing agent of monochlorodifluoromethane and dichlorodifluoromethane, and its weight ratio is within the range of from 20–100:80–0.

* * * * *